March 13, 1951

R. J. PERRET-BIT 2,545,412

APPARATUS FOR THE REGULATION OF
CURRENT IN AN ELECTROLYTIC CELL

Filed Oct. 29, 1945

Inventor:
R. J. Perret-Bit

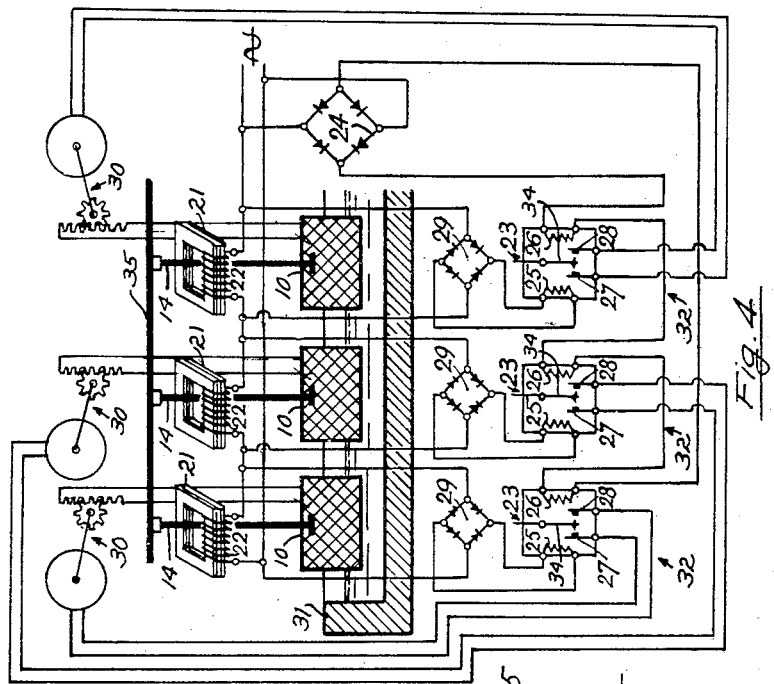
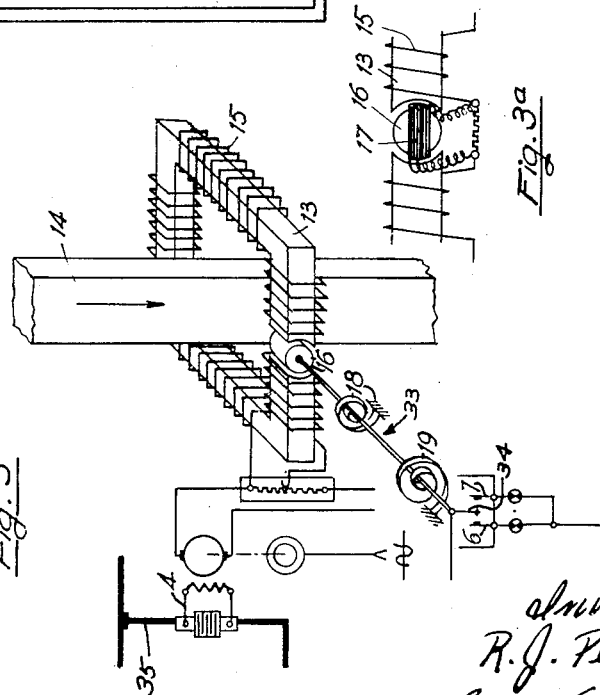

Patented Mar. 13, 1951

2,545,412

UNITED STATES PATENT OFFICE 2,545,412

APPARATUS FOR THE REGULATION OF CURRENT IN AN ELECTROLYTIC CELL

Roger Joseph Perret-Bit, Chambery, France, assignor to Compagnie de Produits Chimiques et Electrometallurgiques Alais, Froges et Camargue, Paris, France, a corporation of France Application October 29, 1945, Serial No. 625,388
In France April 7, 1944

Section 1, Public Law 690, August 8, 1946
Patent expires April 7, 1964

4 Claims. (Cl. 204—225)

This invention relates to electrolytic cells and more particularly to such apparatus in which several electrodes are connected in parallel to one pole of the power source.

Heretofore it has been known that the operation of electrolytic cells can be regulated by the adjustment of the distance between each anode and cathode, so that the current flowing between each such set will be a desired amount, usually the same as that flowing between other like sets of electrodes in the apparatus. If the sets of electrodes are mounted in parallel in the power circuit, all the anode-cathode sets will have the same voltage applied to their terminals. In each circuit from anode to cathode through the electrolyte, the current is determined by Ohm's law to be the voltage applied to the terminals minus the electromotive force of the cell divided by the inter-electrode resistance between the anode and the cathode. During operation, then, it can be seen that the current will vary, since the impressed voltage and the inter-electrode resistance will vary, giving either an uneven deposit on the various electrodes or excess heating with resultant drop in yield. This can be overcome by adjusting the inter-electrode distance to keep the current constant at a desired value relative to that flowing between other electrode sets; however, this is not easy to do since the current in the main power circuit usually varies considerably. Thus, an ammeter in each electrode circuit would be useful to bring about even depositing on the several electrodes when its reading was correlated to the current flowing in other electrode sets and in the main power source. The applicant's invention resides in such a correlation by automatic means.

One object of the present invention is to provide an apparatus for obviating the difficulties of the prior art as recited above.

Another object of the present invention is to provide a device for signalling the existence of a difference between the actual value of the current flowing through an electrode circuit and the desired value of this current relative to the current flowing in other electrode circuits.

Still another object of the present invention is to provide means for operating an automatic adjustment device whenever the relative value of the current flowing through an electrode circuit differs from the value it should have.

Other features of my invention will result from the following detailed description of specific embodiments thereof.

The preferred embodiments of the present invention which will be hereinafter described, with reference to the accompanying drawings, are given merely by way of example.

Figure 2:
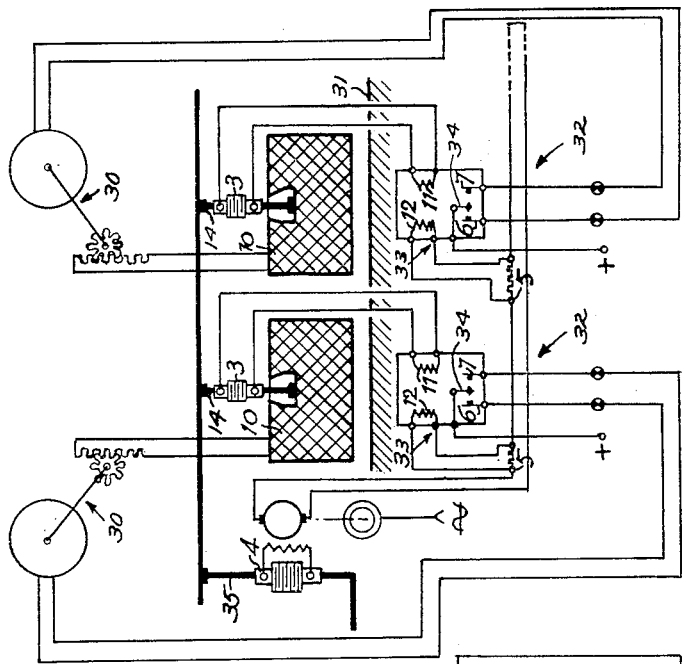
Fig. 2 is a diagrammatical view of an apparatus according to the instant invention for signalling and controlling the existence of a difference between the current actually flowing through an electrode circuit and the value of the current that should flow therethrough.

Figs. 3, 3a, and 4, respectively, are views relating to two other embodiments of the invention.

According to my invention, in order to measure the differences which may exist between the current actually flowing through an electrode circuit and the current that would flow therethrough when the total current fed to an electrolytic cell is uniformly distributed to the electrodes thereof, I do not measure the current flowing through each electrode circuit. As a matter of fact, such a measurement would not give the desired indication, because variations of this current may be caused, not only by an unequal distribution of the current between the various electrode circuits, but also by a variation of the value of the total current in the power circuit. To overcome this difficulty I provide a unit, generally designated 32, for measuring the relationship between the current fed to each electrode set and the total current fed to the electrolytic cell 31.

For this purpose I make use of a balanced relay generally designated 33 having inductance members such as cross coils 1 and 2, said relay being of a known type. One of the coils or windings, say 1, is subjected by means such as shunt 3 coupled with power lead 14 to a voltage proportional to the current flowing from power leads 14 by way of a main lead 35 through the electrode 10, while the other winding 2 is subjected by means such as shunt multiplier 4 connected to the main lead 35 to a voltage proportional to the total current.

Other devices, such as direct-current transformers, may be used which respond with a voltage that is proportional to the current flowing in a circuit to which they are attached. Since most of these devices, except the shunt, give a fairly high voltage, when they are used with coil 2, one device may serve a multitude of coils 2, one for each electrode set, through a series of potentiometers 5.

With such a relay, the deviation angle $\theta$ through which the coils turn is such that:

$$\text{tangent } \theta = \frac{a_1}{a_2}$$

where $a_1$ is the ampere-turns of coil 1 and $a_2$ the ampere-turns of coil 2.

Now, if $i$ is the current flowing through an electrode circuit under consideration, and $I$ the total current fed to the whole electrolytic cell, then $$a_1 = K_1 i$$

and $$a_2 = K_2 I$$

so that $$\text{tangent } \theta = \frac{K_1}{K_2} \frac{i}{I}$$

If, by means of potentiometer 5, we adjust the values of $K_1$ and $K_2$ so that $$\frac{K_1}{K_2} = n$$

$n$ being the number of individual electrode sets in the apparatus, then $$\text{tangent } \theta = n\frac{i}{I} = \frac{i}{\frac{I}{n}}$$

The apparatus will, therefore, indicate the ratio of the current flow in the electrode that is being considered to the desired current that should flow therethrough, which is usually $I/n$.

The actuated member of the relay will engage connections 6 or 7, depending on the movement of coils 1 and 2 and will actuate on adjusting means 30 for adjusting the inter-electrode space, said adjusting means comprising a motor, for instance.

Figure 1:
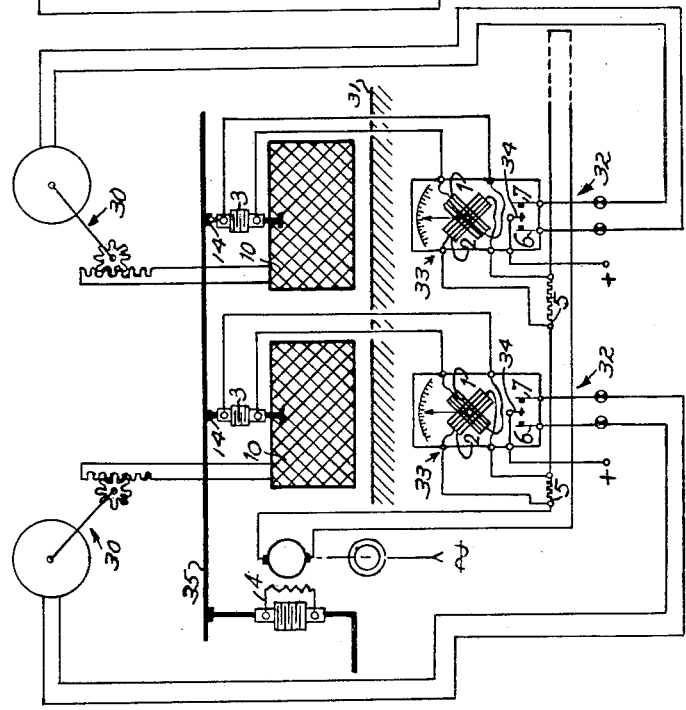
Fig. 1 is a diagrammatical view of an apparatus according to the invention of the applicant for the measurement of the ratio of the current flowing through an electrode circuit and the total current in the power circuit.

In the embodiment illustrated in Fig. 2 for use with a cell 31, I make use of units 32 having a balanced differential relay 33 and, having two coils 11 and 12 wound so that their fields act in opposition. One of the coils 11 has impressed upon it a voltage proportional to the current flowing through the power lead 14 attached to the electrode 10 that is under consideration, this voltage being obtained through a means such as shunt 3 coupled with a power lead 14, as shown in the drawing, or a direct current transformer of a type well-known. Coil 12 has impressed upon it a voltage proportional to the current flowing through the total cell circuit, this being obtained by a means such as shunt multiplier 4 connected to a main lead 35 through which current passes to the power leads 14. As in the embodiment of Figure 1, if the device for obtaining a voltage proportional to the current flowing through the main power circuit gives a high enough voltage, it may be used in conjunction with potentiometers 5 to serve all the coils 12 where a plurality of electrode sets are present.

Two opposed springs, not shown, are disposed so that, when the driving torque on the actuated member 34 of the relay, due to the coils, is zero, said actuated member is in intermediate position between the connections 6 and 7. If this torque is either positive or negative, the actuated member of the relay may cooperate with either connections 6 or connections 7 according as the difference between the ampere-turns of coil 1 and the ampere-turns of coil 2 is positive or negative.

If $a_1$ designates the ampere-turns of coil 1 and $a_2$ the ampere-turns of coil 2, $$a_1 = K_1 i$$

and $$a_2 = K_2 I$$

$i$ being the current in the electrode, and $I$ the total current in the electrolysis cell.

Therefore, where $\epsilon$ is difference between the strength of the electromagnetic fields of the windings, $$\epsilon = a_1 - a_2 = K_1 i - K_2 I$$

If, by means of potentiometer 5, we adjust the values of $K_1$ and $K_2$ so that:

$$K_1 = nK_2$$

$n$ being the number of electrodes, then $$\epsilon = K_1 \left( i - \frac{I}{n} \right)$$

and when the current $i$ in the electrode that is being considered is at the desired value, usually $I/n$, the difference $\epsilon$ is equal to zero and the actuated member of the relay is balanced in the intermediate position, with both connections 6 and 7 open.

When $i$ is smaller than $I/n$, connection 6 is closed, and when $i$ is greater than $I/n$, connection 7 is closed, irrespective of the value of the total current intensity. According to whether connection 6 or 7 is closed, the adjusting means 30 will operate to make the inter-electrode space shorter or longer, with a corresponding increase or decrease of current through the particular anode-cathode set adjusted.

Fig. 3 shows another embodiment of a device according to the invention for signalling the existence of a difference between the actual value of the current flowing through an electrode and the value that this current should have, this device being intended either to permit manual control of the resistance corresponding to this electrode or to control the adjustment of this resistance automatically.

In this unit for use with an electrolytic cell device, an inductance member such as magnetic coil or core 13 is coupled with power lead 14 connecting the electrode to the current feed. The magnetic core 13 carries an inductance member such as a coil 15 whose windings are such as to induce in the core an electromagnetic flux opposite to the flux induced in said core by the current flowing in the bar 14. In said coil 15 is carried a current brought to it by a means such as shunt multiplier 4, or similar device connected to the main lead 35 and responsive to the amount of current flowing in the main power circuit. If $a_1$ designates the ampere-turns of the coil 15 and $i$ the current flowing through the bar 14, the flux induced in the magnetic core 13 will be zero when:

$$a_1 = i$$

With a shunt multiplier 4, shown in the drawing, or a direct current transformer having a transformation ratio $m$, the current $i_2$ fed to coil 15 is:

$$i_2 = \frac{I}{m}$$

Now, if $n$ is the number of electrode circuits of the electrolytic cell, and if the number of turns, $N$, of coil 15 is chosen in such manner that:

$$N = \frac{m}{n}$$

then the flux induced in the magnetic core 13 will be zero when $$a_1 = Ni_2 = N\frac{I}{m} = \frac{m}{n}\frac{I}{m} = \frac{I}{n} = i$$

When $i$ is greater than $I/n$, the resultant flux in magnetic core 13 is in one direction, whereas, when $i$ is smaller than $I/n$, the flux is in the opposite direction.

Indication of the existence and direction of this flux is obtained through a balanced relay generally designated 33, comprising a magnetic cylinder 16 having its axis perpendicular to central bar 14 and carrying a winding 17 traversed by a current supplied from coil 15, as best shown in Fig. 3a. The flux produced by the current flowing in the coil 17 reacts with the flux induced in the core 13 when there is a difference between the flux induced in core 13 by the current in the bar 14 and the flux induced in core 13 by the current in the coil 15. This produces a rotational couple upon the cylinder 16, dependent on the direction of the resultant flux in core 13.

Two opposed springs 18 and 19 yieldingly oppose rotation of cylinder 16 about its axis, so that in the absence of a substantial resultant flux in magnetic core 13, element 16 is maintained in a determined position of rest, corresponding to movable coil 17 being located in the plane of magnetic core 13.

The axis of movable cylinder 16 carries an actuated member adapted to cooperate with connections 6 and 7, which may be connected either with signalling means or with automatic adjusting means not shown. Relays of the type just above described may be utilized in combination with auxiliary or delayed-action relays according to the amount of current to be supplied through their contacts and the small variations in current that should have no effect on the system.

In Fig. 4 is shown a series of units generally designated 32 an embodiment of my invention to be used when, for some reason, it is not possible to make use of the ohmic drop along each electrode conductor, as in the above described embodiments. In this case, I make use of the fact that a variation of reactance takes place in a coil mounted on a magnetic core when direct current ampere-turns are superposed on the alternating current ampere-turns existing in this coil. Each of the power leads 14 connecting the electrodes 10 of the cell 31 with the current feed through main lead 35 has coupled therewith a means such as a magnetic core 21, which may be shielded to protect said core against the parasitic action of the other conductors. The windings 22 wound on said cores 21 are fed in series from a source of alternating current. In the absence of direct current being impressed thereon, the current flowing in these windings 22 is the total voltage U divided by the sum of the reactances of the coils mounted on $n$ magnetic cores 21 ($n$ being the number of electrode sets in the apparatus), the ohmic resistance being very small compared to the reactance.

If all the cores and windings are exactly identical, the voltages, $U_1, U_2 \ldots U_n$, across the terminals of said windings will be such that:

$$u_1 = u_2 = u_3 = \ldots u_n = \frac{U}{n} = L\omega i$$

If direct current is caused to flow through each conductor connected to the electrode 10, the reactance of each of the cores will be reduced, due to the saturation produced by the action of this direct current, but, if this action is the same for all of the cores, that is to say, if the currents passing through the $n$ electrodes are equal, the same relation between voltages $u_1, u_2 \ldots u_n$, and U is preserved.

However, if there is an unequality in the distribution of the current among the electrodes, the voltages in question are no longer equal to one another, although their sum is still equal to U. It should be noted that it is possible that U may remain constant, and in that case, the alternating current flowing through the windings will be variable in accordance with the reactance of each magnetic core. I may also arrange to have current $i$ substantially constant, which will place these circuits under better magnetic conditions, but will cause voltage U to vary, the above equations remaining however unchanged.

In order to indicate variations in distribution, I make use of balanced differential relays 23 of a known type, each having two inductance members such as movable coils 25 and 26 located in the field of a permanent magnet. On one of these coils, 25, is impressed a voltage proportional to the voltage in its respective coil 22, this coil voltage being rectified by a rectifier 29 before being impressed on the coil 25. The other coils 26 of the relays are all connected in series and subjected to the voltage U rectified first by a means such as rectifier 24.

This device will work in the following manner:

If $a_1$ designates the ampere-turns of coil 25 and $a_2$ the ampere-turns of coil 26, according to whether difference $\epsilon$ is positive or negative, the force acting upon the actuated member 34 of the relay, which force is proportional to this difference, will be positive or negative. Then either connection 27 or 28 will be closed depending on the direction of movement of the actuated member, while, when the difference in question is equal to zero, both of these connections 28 and 27 are open. The closure of one of the connections will, of course, actuate the adjusting means 30 for changing the inter-electrode space.

Considering one electrode 10, $$a_1 = K_1 u_1$$
$$a_2 = K_2 \frac{U}{n}$$

$n$ being the number of electrodes of the electrolytic cell that is being considered.

Therefore, $$\epsilon = a_1 - a_2 = K_1 u_1 - K_2 \frac{U}{n}$$

If the system is constructed in such manner that $K_1 = K_2 = K$, then:

$$\epsilon = K\left(u_1 - \frac{U}{n}\right)$$

Then the actuated member of the relay will be balanced in intermediate position, with connections 27 and 28 open when $$u_1 = \frac{U}{n}$$

But, at this time:

$$u_1 = f_1(I_1, i) = \frac{U}{n}$$

$f_1$ representing the function existing between $u_1$, the current $f_1$ flowing through the electrode that is considered, and the alternating current $i$ flowing through the windings of all the circuits.

If all the magnetic circuits are identical, then:

$$f_1 = f_2 = f_3 \ldots = f_n = f$$

Since on the other hand, $$u_1 + u_2 + u_3 + \ldots u_n = U$$

then, $$f(I_1, i) + f(I_2, i) + f(I_n, i) = U$$

Since current $i$ is the same for all the winding circuits, if $$I_1 = I_2 = \ldots I_n = \frac{I}{u}$$

then $$u_1 = u_2 = \ldots u_n = \frac{U}{n}$$

As the relay is balanced when $$u_1 = \frac{U}{n}$$

then at this time:

$$I_1 = \frac{I}{n}$$

In other words, the actuated member of the relay is in a neutral position when the direct current flowing through the electrode that is being considered is equal to the total current divided by the number of electrodes. On the other hand, one of the connections will be closed if $I_1$ is smaller than $I/n$, while the other connection will be closed if $I_1$ is greater than $I/n$, and this irrespective of the value of alternating current $i$ and of function $f$, provided that:

$$f_1 = f_2 = \ldots f_n = f$$

in other words provided that all the windings 22 and cores 21 are identical.

The devices above described permit anticipating anode effects by arranging the parts in the relays so that action takes place for a predetermined difference between the normal current that is to flow through each electrode set and a current substantially different from this normal current because of such effects. It has been noticed that, in electrolysis cells undergoing anode effect and which include several electrodes, polarizing does not take place simultaneously for all the electrodes, but, on the contrary, a short time before the total anode effect, polarization takes place for one of the electrodes. The apparatus arranged according to the invention permits anticipating the anode effects by providing two series of contacts, the first series being closed for small variations from a state of equilibrium and serving to adjust the interelectrode space, while the second series responds to an important reduction of the current flowing in one of the electrodes, to warn that anode effect will occur in a short time.

I may make use either of apparatus having two sets of contacts, as described above, or two sets of relays, etc., for each electrode, one of these sets being adjusted in such manner as to have its contacts closed for relatively small current variations, the other adjusted in such manmen as to have its contacts closed for an important reduction of the current on one electrode.

It is also possible, according to the present invention, to provide this second series of connections or this second set of relays, etc., on only one of the electrodes, provided the latter is adjusted in such manner that the current flowing therethrough is permanently higher than the current flowing through each of the other electrodes, which causes electrolysis to take place more rapidly in the zone of the bath corresponding to that electrode, whereby polarization always starts first on the electrode in question.

In a general manner, while I have, in the above description, disclosed what I deem to be practical and efficient embodiments of the present invention, it is to be understood that I do not wish to be limited thereto, since changes may be made in the arrangement, disposition, and form of the parts without departing from the principle of the present invention as defined by the accompanying claims.

Having thus described my invention, what I claim as new and desire to secure by Letters Patent is:

1. An electrolytic apparatus having at least one cell for containing an electrolyte and having a plurality of units each comprising two electrodes immersed in said electrolyte, adjusting means for moving one of said electrodes toward and away from the other electrode, power leads attached to said electrodes for connection through a main lead with a direct-current source, a balanced relay in each unit having two inductance members whose electromagnetic fields are in opposition and a member actuated by said inductance members, said actuated member moving between a connection for causing the adjusting means to move the said one electrode away from the other electrode and a connection for causing said adjusting means to move the said one electrode toward the other electrode, means coupled with the power lead of one of said electrodes for impressing on one of said inductance members a voltage proportional to the current flowing through said electrode, and means connected to the main lead for impressing on the other of said inductance members a voltage proportional to the current flowing through all of the units.

2. An electrolytic apparatus as recited in claim 1, wherein: a core surrounds the power lead and has a gap at one part thereof, the electromagnetic field existing in said gap acting on said actuated member for the movement thereof.

3. An electrolytic apparatus as recited in claim 1, wherein: said means coupled with the power lead of one of said electrodes comprises a magnetic core surrounding said power lead, a winding on said core, means for connecting said winding to a source of alternating current, said winding being connected to one side of a rectifier, the other side of which is connected to said inductance member.

4. An electrolytic apparatus having at least one cell for containing an electrolyte and having a plurality of units each comprising two electrodes immersed in said electrolyte, adjusting means for moving one of said electrodes toward and away from the other electrode, power leads attached to said electrodes for connection through a main lead with a direct-current source, a balanced relay in each unit having two opposed actuating coils and an actuated member, said actuated member moving between a connection for causing the adjusting means to move the said one electrode away from the other electrode and a connection for causing said adjusting means to move the said one electrode toward the other electrode, means coupled with the power lead of one of said electrodes for impressing on one of said coils a voltage proportional to the current flowing through said electrode, and means connected to the main lead for impressing on the other of said coils a voltage proportional to the current flowing through all of the units.

ROGER JOSEPH PERRET-BIT.

REFERENCES CITED

The following references are of record in the file of this patent:

UNITED STATES PATENTS

| Number | Name | Date |
|---|---|---|
| 1,396,919 | Brace | Nov. 15, 1921 |
| 1,449,897 | Evans | Mar. 27, 1923 |
| 1,547,984 | Weber | July 28, 1925 |
| 1,587,106 | Edelman | June 1, 1926 |
| 1,849,838 | Kennedy | Mar. 15, 1932 |
| 1,917,657 | MacChesney | July 11, 1933 |
| 2,150,015 | Witham | Mar. 7, 1939 |
| 2,213,099 | Adorjan | Aug. 27, 1940 |
| 2,248,504 | Kenny | July 8, 1941 |
| 2,357,524 | Klepp | Sept. 5, 1944 |
| 2,374,199 | Harris | Apr. 24, 1945 |
| 2,401,722 | Clapp | June 11, 1946 |
| 2,409,866 | Jewell | Oct. 22, 1946 |

FOREIGN PATENTS

| Number | Country | Date |
|---|---|---|
| 333,727 | Great Britain | Aug. 21, 1930 |